United States Patent [19]

Endo

[11] Patent Number: 5,754,550
[45] Date of Patent: May 19, 1998

[54] SYSTEM DATA TRANSFER THROUGH A FIXED PATH IN A SWITCHING SYSTEM

[75] Inventor: Koji Endo, Tokyo, Japan

[73] Assignee: NEC Corporation, Tokyo, Japan

[21] Appl. No.: 445,196

[22] Filed: May 23, 1995

[30] Foreign Application Priority Data

May 23, 1994 [JP] Japan ................... 6-108150

[51] Int. Cl.⁶ ........................................ H04J 3/12
[52] U.S. Cl. ........................ 370/419; 370/422; 370/426
[58] Field of Search ........................ 370/54, 58.1, 58.2, 370/58.3, 60.1, 60, 68.1, 94.1, 110.1, 351, 352, 353, 354, 355, 356, 357, 360, 380, 381, 386, 389, 392, 398, 399, 412, 384, 419, 420, 422, 426, 427, 463, 369, 522, 375, 423, 393, 395; 379/399

[56] References Cited

U.S. PATENT DOCUMENTS

| | | | |
|---|---|---|---|
| 4,761,779 | 8/1988 | Nara et al. | 370/68.1 |
| 5,086,424 | 2/1992 | Motohashi | 370/384 |
| 5,303,236 | 4/1994 | Kunimoto et al. | 370/68.1 |
| 5,481,605 | 1/1996 | Sakurai et al. | 370/384 |
| 5,568,479 | 10/1996 | Watanake et al. | 370/426 |

*Primary Examiner*—Wellington Chin
*Assistant Examiner*—Huy D. Vu
*Attorney, Agent, or Firm*—Sughrue, Mion, Zinn, Macpeak & Seas, PLLC

[57] ABSTRACT

A switching system comprises a time division switch for forming a fixed path through which a line circuit and a trunk circuit are connected to each other. Both the line circuit and the trunk circuit have a discrimination function and a transfer function. For example, when the trunk circuit receives system data packets including predetermined system data packets from a call processor, the trunk circuit discriminates the predetermined system data packets from the system data packets using an identifier of each packet. The predetermined system data packets are transferred to the line circuit through the fixed path of the time division switch. Receiving the predetermined system data packets from the trunk circuit, the line circuit stores the predetermined system data as well as system data for the trunk circuit received from the call processor into a memory thereof. Using the predetermined system data and the system data for the trunk circuit stored in the memory, the line circuit processes communication information packets received from the terminal or the network.

41 Claims, 12 Drawing Sheets

F I G. 4
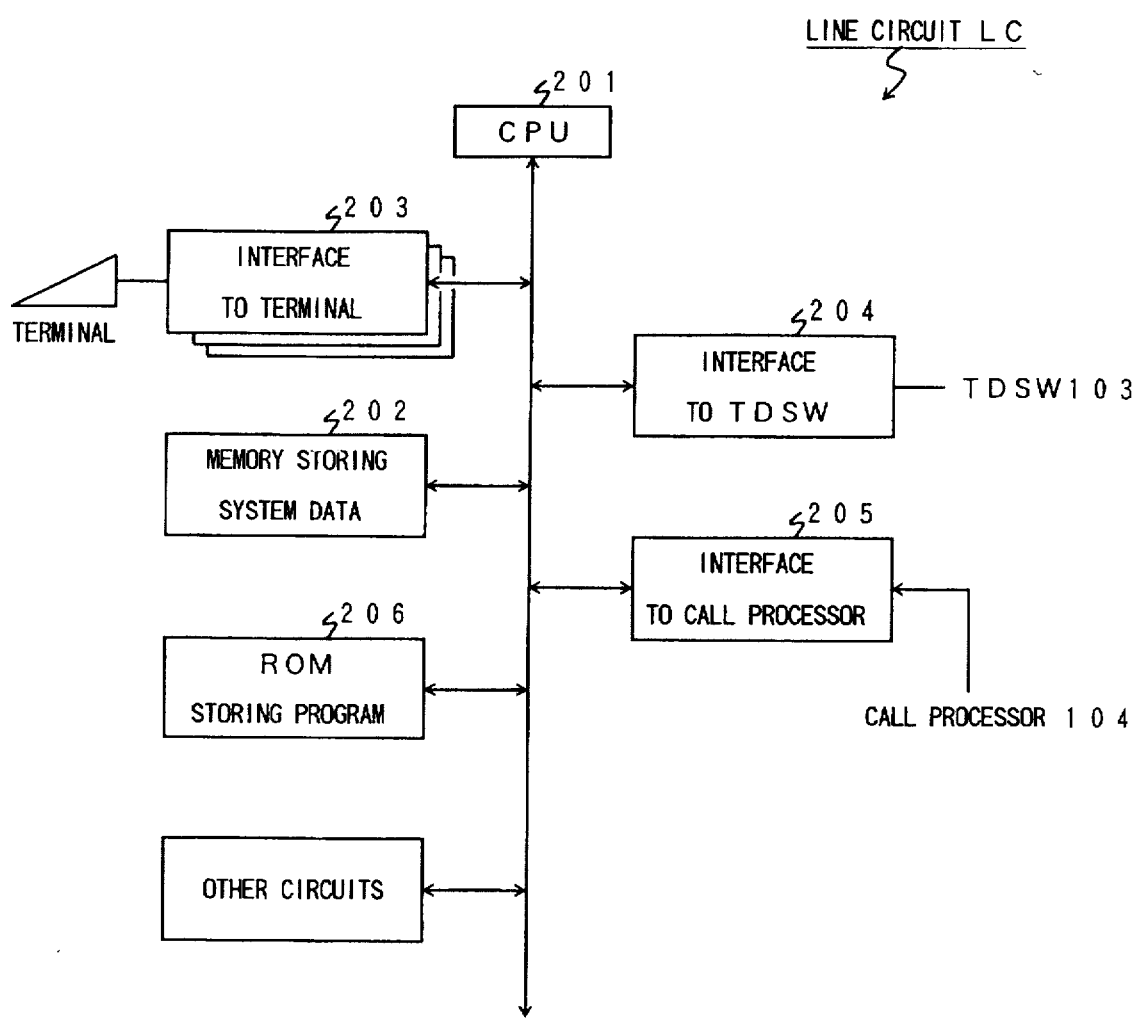

C I : COMMUNICATION INFORMATION
S Y S : SYSTEM DATA (S Y S L D or S Y S T D) FROM C P R
S Y S A : PREDETERMINED SYSTEM DATA (S Y S L T or S Y S T L) FROM C P R
S Y S A + S Y S B : PREDETERMINED SYSTEM DATA TRANSFERRED BETWEEN L C AND T C THROUGH T D S W

SYSTEM DATA TRANSFER THROUGH A FIXED PATH IN A SWITCHING SYSTEM

BACKGROUND OF THE INVENTION

1. Field of the Invention

The present invention relates to a switching system, in particular to a method for transferring system data to respective line supervising circuits such as a line circuit and a trunk circuit.

2. Prior Art

In a switching system, a line circuit LC is a line supervising circuit connecting terminal equipment with a network switch, and a trunk circuit TC is a line supervising circuit connecting the network switch with a public network, a private line and the like. The line circuit LC operates in accordance with system data SYSLD which defines interface information such as a type of the terminal equipment, an extension number, and a control action. The trunk circuit operates in accordance with system data SYSTD which defines interface information such as the type of network (public, private, analog, digital, ISDN, and etc.), and dialing type (pulse or tone). In a conventional switching system, such system data SYSLD and SYSTD are transferred to the line circuit and the trunk circuit, respectively, under control of a call processor of the switching system. The details are described hereinafter.

FIG. 1 shows a conventional ISDN switching system disclosed in Japanese Patent Application No. 5-280756 (which was filed by the same applicant but not published at the present time). Referring to the figure, a switching system 1 is comprised of a switch 2, a plurality of line circuits LC ($LC_1$–$LC_n$), a plurality of trunk circuits TC ($TC_1$–$TC_m$), a call processor 3, and a system memory 4. Each line circuit is provided with a memory 5 for storing the system data SYSLD therefor, and each trunk circuit is provided with a memory 6 for storing the system data SYSTD therefor.

The system data SYSLD and SYSTD are stored in the system memory as shown in FIG. 2. The system data SYSLD is comprised of system data $SYSLD_1$–$SYSLD_m$ corresponding to the line circuits $LC_1$–$LC_n$ respectively. The system data SYSTD is comprised of system data $SYSTD_1$–SYSTD, corresponding to the trunk circuits TC1–TCm, respectively. Furthermore, the system memory 4 stores a system data relational file 7 which relates the system data $SYSLD_1$–$SYSLD_n$ to the system data $SYSTD_1$–$SYSTD_m$.

It is assumed in this ISDN switching system that the respective system data $SYSTD_1$–$SYSTD_m$ include predetermined system data $SYSLT_1$–$SYSLT_m$ for D-channel packet communications. As described in the specification of the abovementioned patent application (No. 5-280756), D-channel packet communications are performed as follows. When a D-channel packet is received from a public ISDN network through a trunk circuit TCi, the line circuit LCj converts the destination address information of the D-channel packet to send the packet of data to a D-channel packet terminal connected to the line circuit LCj. The conversion of the destination address is performed by using the system data SYSLDj and the predetermined system data SYSLTi of the system data SYSTDi. Therefore, it is necessary that the predetermined system data SYSLTi is transferred from the system memory 4 to the memory 5 of the line circuit LCj.

In the conventional system, the call processor 3 controls the transfer of the system data and the predetermined system data. More specifically, when reading the system data SYSTDi from the system memory 4, the call processor 3 searches for the predetermined system data SYSLTi by referring to the system data relational file 7. If the predetermined system data SYSLTi is found, the call processor 3 transfers the system data SYSTDi in packet form to the trunk circuit TCi and also transfers the predetermined system data SYSLTi in packet form to the line circuit LCj. The system data SYSTDi is stored in the memory 6 of the trunk circuit TCi, and the predetermined system data SYSLTi is stored in the memory 5 of the line circuit LCj.

Similarly, if predetermined system data is found in the system data SYSLDj, the call processor 3 transfers the system data SYSLDj to the line circuit LCj, and also transfers the predetermined system data to the trunk circuit TCi.

However, in the conventional system, since the predetermined system data is directly transferred to the line circuit LC or the trunk circuit TC by the call processor 3, the call processor 3 is burdened with this task.

In addition, since the conventional system requires the use of a system data relational file 7 to relate the system data $SYSLD_1$–$SYSLD_n$ to the system data $SYSTD_1$–$SYSTD_m$, the capacity of the system memory 4 is increased. Furthermore, the use of a system data relational file 7 complicates the task of storing the system data into the line supervising circuits.

SUMMARY OF THE INVENTION

An object of the present invention is to provide a switching system where interface data are transferred to respective line supervising circuits so that the burden of a call processor is reduced.

Another object of the present invention is to provide a switching system having a system memory of a minimized capacity without the need for the system data relational file.

Still another object of the present invention is to provide a system and a method of transferring necessary system data from one line supervising circuit to the other without burdening a call processor or increasing the system memory capacity.

A switching system according to the present invention is comprised of a switch for forming a predetermined path through which two certain line supervising circuits are connected to each other and a plurality of line supervising circuits each having a discrimination function and a transfer function.

More specifically, each the line supervising circuit receives information from a terminal, a network, a call processor, or the switch. System information comprising system data for the line supervising circuit is discriminated from the information, and then first system information is further discriminated from the system information. Furthermore, the line supervising circuit discriminates second system information from the information. The second system information is received from another line supervising circuit through the predetermined path. Finally, the first system information is transferred to another line supervising circuit through the predetermined path.

The system information for each line supervising circuit is stored in a system memory of the switching system. A controller controls the switch, the line supervising circuits and the system memory such that the predetermined path is formed in the switch and the system information is transferred from the system memory to each line supervising circuit.

Each the line supervising circuit preferably comprises a memory for storing the system information and the second system information and a processor for processing communication information included in the information using the system information and the second system information stored in the memory.

It is more preferable that the system information comprises information packets. An identifier of each information packet discriminates between the system information, the first system information, and the second system information.

BRIEF DESCRIPTION OF THE DRAWINGS

FIG. 4 is a detailed block diagram showing a line circuit in the first embodiment;

DETAILED DESCRIPTION OF THE PREFERRED EMBODIMENTS

FIRST EMBODIMENT

Figure 1:
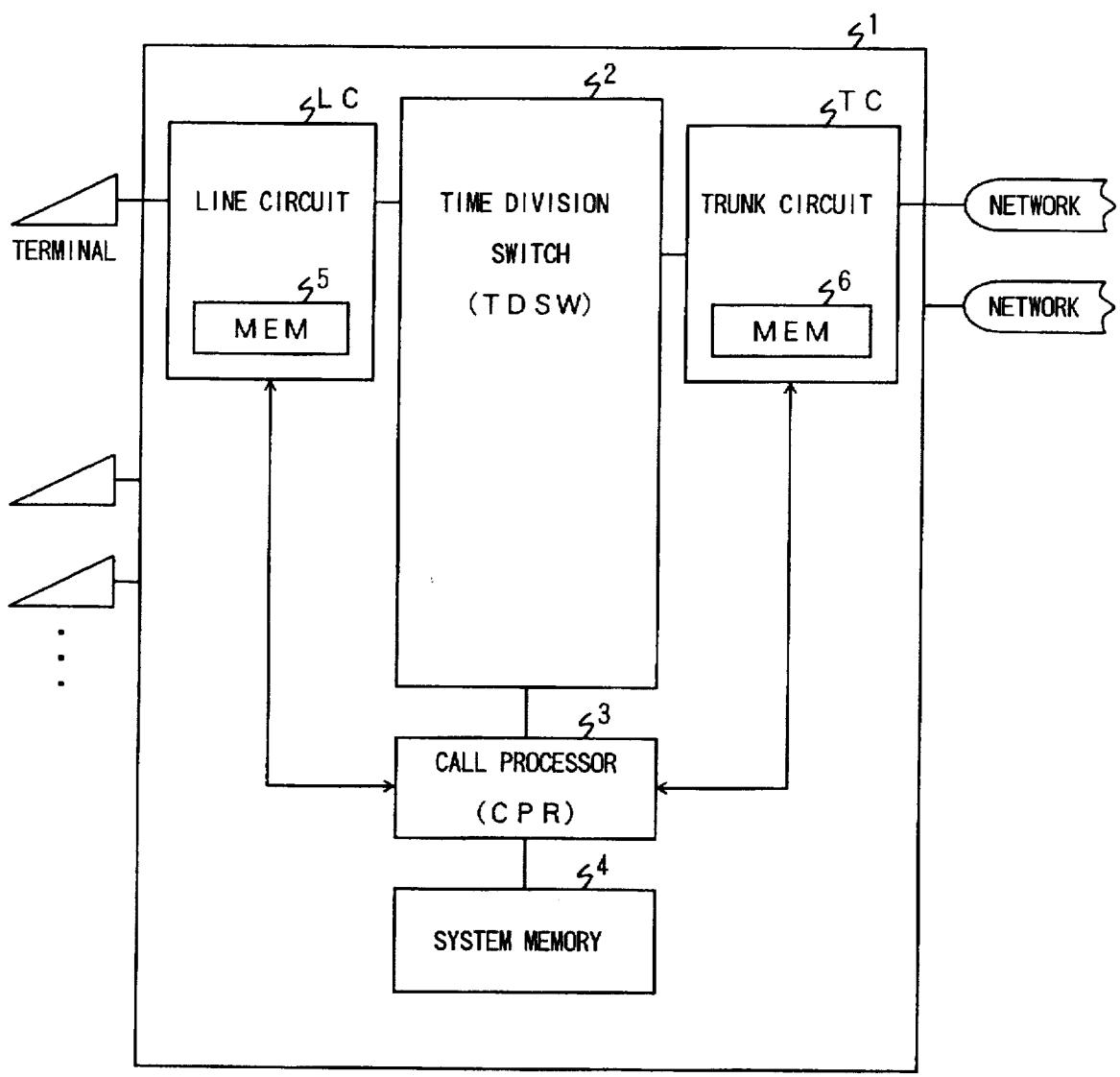
FIG. 1 is a block diagram showing a conventional switching system.
Figure 2:
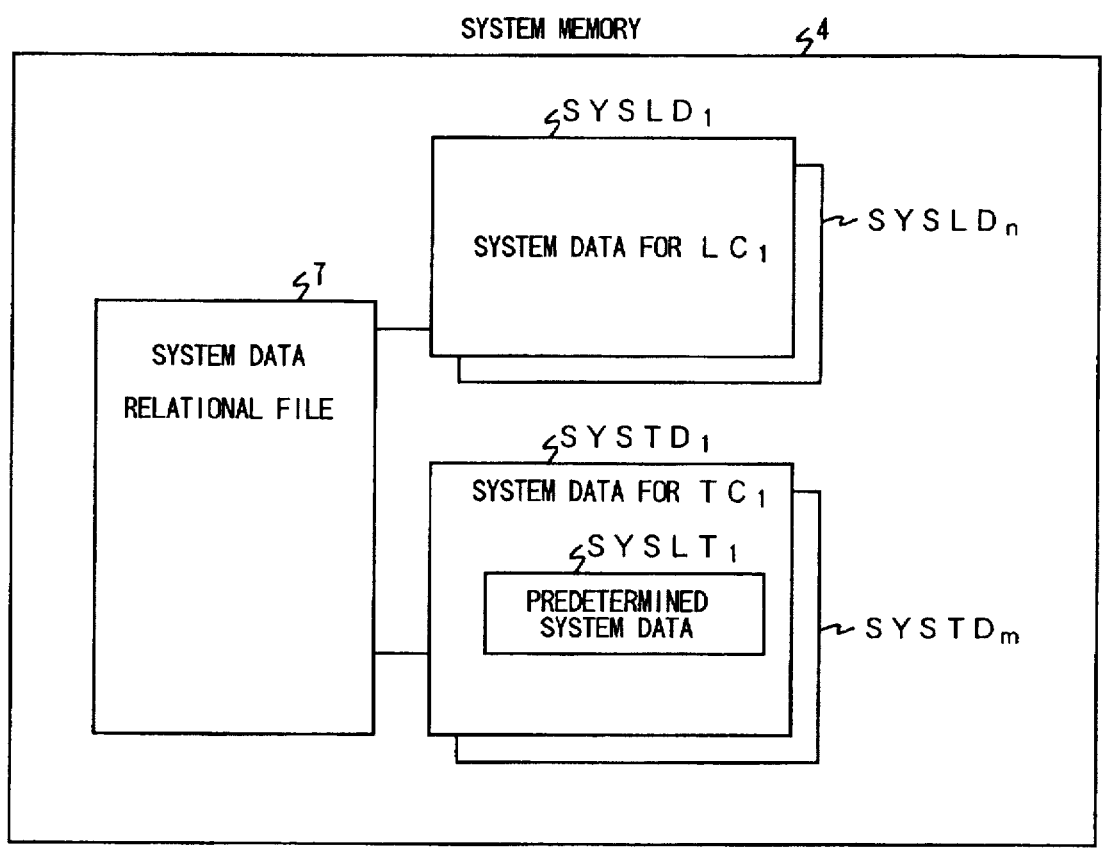
FIG. 2 is a schematic diagram showing a data file configuration of a system memory in the conventional switching system.
Figure 3:
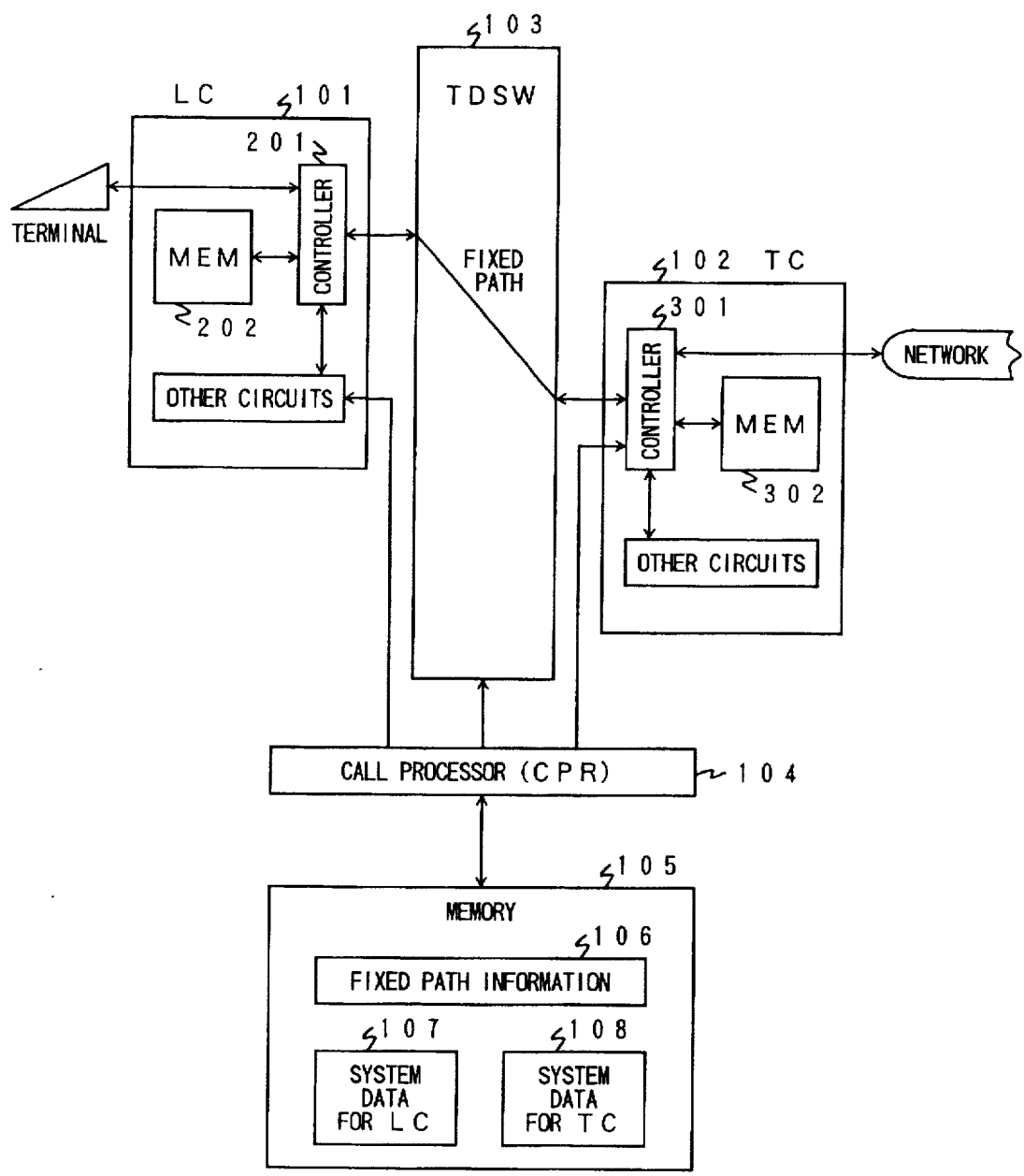
FIG. 3 is a block diagram showing a switching system of a first embodiment according to the present invention.

As illustrated in FIG. 3, a switching system, for example, a private branch exchange (PBX), is comprised of a plurality of line circuits LC and a plurality of trunk circuits TC which are respectively connected through predetermined fixed paths formed in a time division switch (TDSW) 103. For simplicity, it is assumed that a line circuit 101 is connected to a trunk circuit 102 through a fixed path of the time division switch 103. The line circuit 101 is connected to a packet terminal through a subscriber line, and the trunk circuit 102 is connected to an ISDN public network, a private network, a private line and so on. A call processor 104 performs the call process control of the switching system and manages a system memory 105 which stores the system data of the whole switching system.

The data stored in the system memory 105 is comprised of a fixed path information file 106 and system data files 107 and 108. The call processor 104 uses the fixed path information file 106 to form predetermined fixed paths in the time division switch 103. The system data file 107 is comprised of interface data for the line circuit 101 including predetermined system data which is also used in the trunk circuit 102. The system data file 108 is comprised of interface data for the trunk circuit 102 including predetermined system data which is also used in the line circuit 101. The details of the system data files 107 and 108 will be described later.

The system data for the line circuit 101 is read from the system data file 107 of the system memory 105 and is transferred in packet form to the line circuit 101 by the call processor 104. The system data for the trunk circuit 102 is read from the system data file 108 of the system memory 105 and is transferred in packet form to the trunk circuit 102 by the call processor 104. The line circuit 101 is comprised of a controller 201, a memory 202, and other circuits. Upon receiving packets from the subscriber terminal, the time division switch 103 or the call processor 104, the controller 201 selects system data packets to store them into the memory 202 and further selects predetermined system data packets to transfer them to the trunk circuit 102 depending on the identifier of each received packet. The memory 202 stores the system data of the line circuit 101 including predetermined system data received from the trunk circuit 102.

Similarly, the trunk circuit 102 is comprised of a controller 301, a memory 302, and other circuits. Upon receiving packets from the network, the time division switch 103 or the call processor 104, the controller 301 selects system data packets to store them into the memory 302 and further selects predetermined system data packets to transfer them to the line circuit 101 depending on the identifier of each received packet. The memory 302 stores the system data of the trunk circuit 102 including predetermined system data received from the line circuit 101.

Referring to FIG. 4, the line circuit 101 is further comprised of interface circuits 203, 204 and 205, and a read only memory (ROM) 206. The interface circuits 203, 204 and 205 are connected to the subscriber terminal, the time division switch 103, and the call processor 104, respectively. The ROM 206 stores a basic program for operating the line circuit 101 as well as a system data transfer program according to the present embodiment. Using these software programs, the processor 201 controls the interface circuits, the memory 202 and other necessary circuits.

Figure 5:
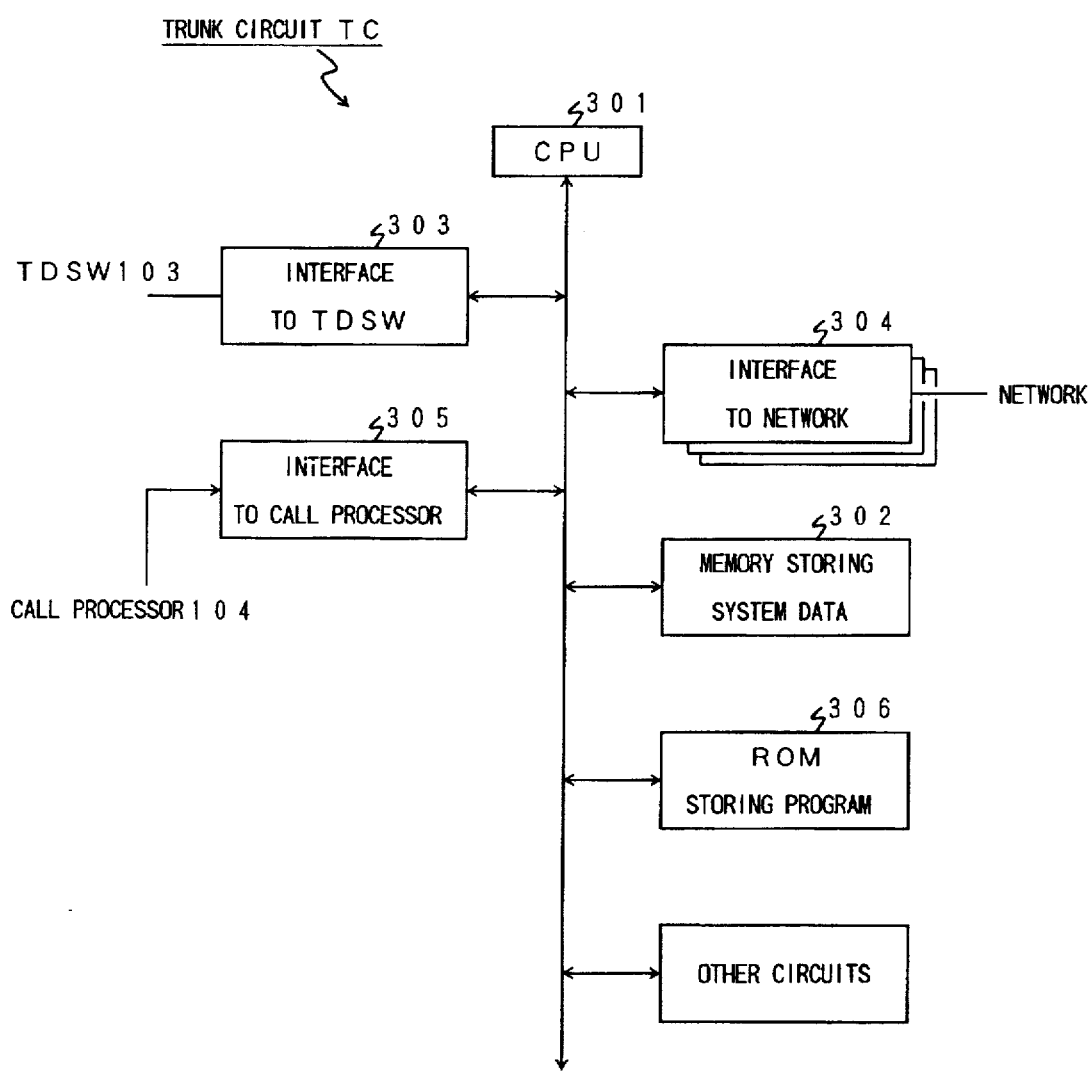
FIG. 5 is a detailed block diagram showing a trunk circuit in the first embodiment.

Referring to FIG. 5, the trunk circuit 102 is further comprised of interface circuits 303, 304 and 305, and a ROM 306. The interface circuits 303, 304 and 305 are connected to the time division switch 103, the network and the call processor 104, respectively. The ROM 306 stores a basic program for operating the trunk circuit 102 as well as a system data transfer program according to the present embodiment. According to these software programs, the processor 301 controls the interface circuits, the memory 302, and other necessary circuits.

Figure 6:
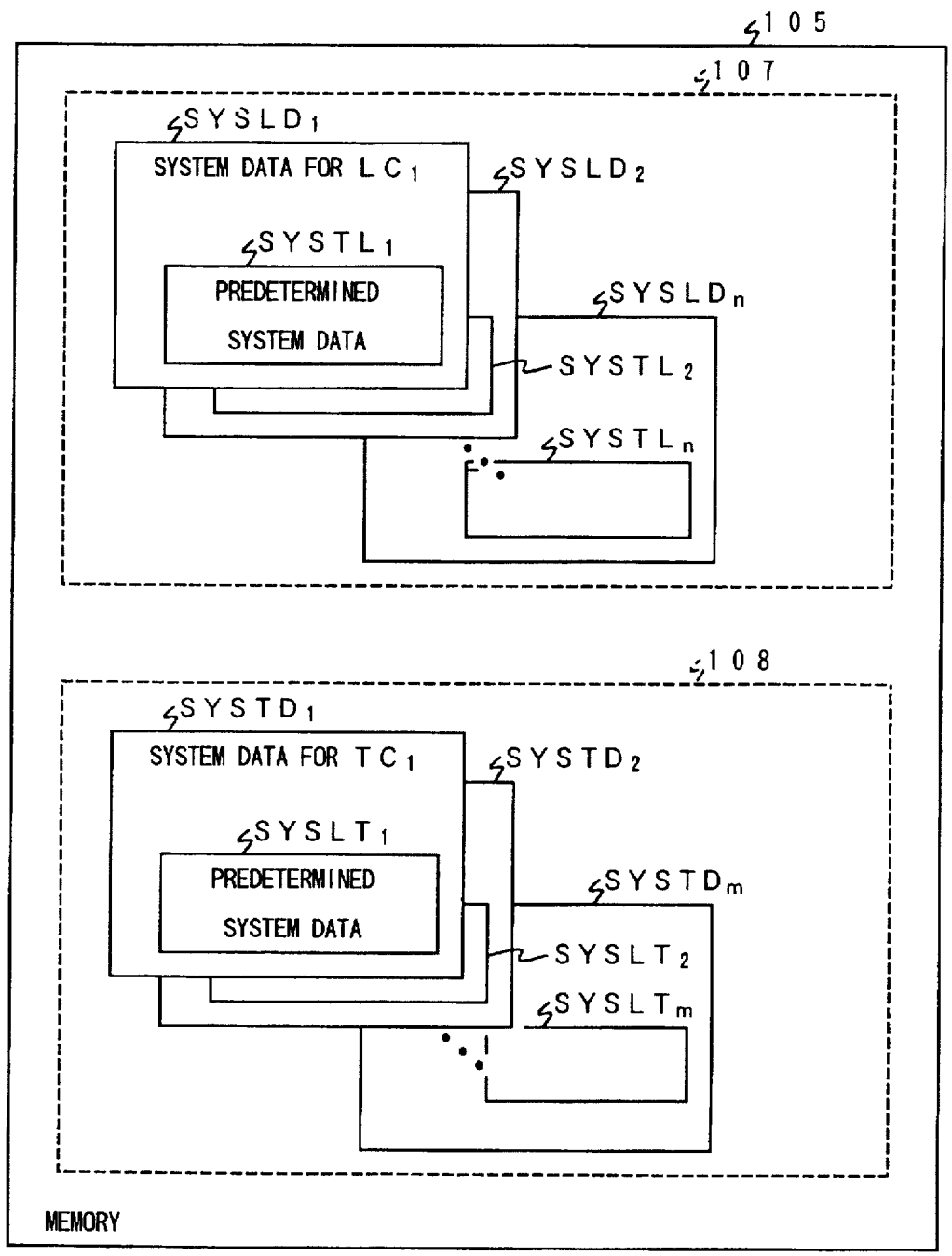
FIG. 6 is a schematic diagram showing a data file configuration of a system memory in the first embodiment.

As shown in FIG. 6, the system data file 107 is comprised of the system data $SYSLD_1$–$SYSLD_n$ for the respective line circuits $LC_1$–$LC_n$. Hereinafter, it is assumed that the system data $SYSLD_1$–$SYSLD_n$ include the predetermined system data $SYSTL_1$–$SYSTL_n$, respectively, which are to be transferred to trunk circuits through the predetermined fixed paths of the time division switch 103.

Similarly, the system data file 108 is comprised of the system data $SYSTD_1$–$SYSTDm$ for the respective trunk circuits $TC_1$–$TC_n$. Hereinafter, it is assumed that the system data $SYSTD_1$–$SYSTD_m$ include the predetermined system data $SYSLT_1$–$SYSLT_m$, respectively, which are to be transferred to line circuits through the predetermined fixed paths of the time division switch 103.

As mentioned above, the system data SYSLD and SYSTD are transferred in packet form from the call processor 104 to the line circuit 101 and the trunk circuit 102, respectively. Since the controller 201 and 301 receive various packets from the subscriber terminal and the network, a predetermined identifier (ID) needs to be attached to each packet of system data in order to discriminate between the system data packet and the other packets.

Figure 7:
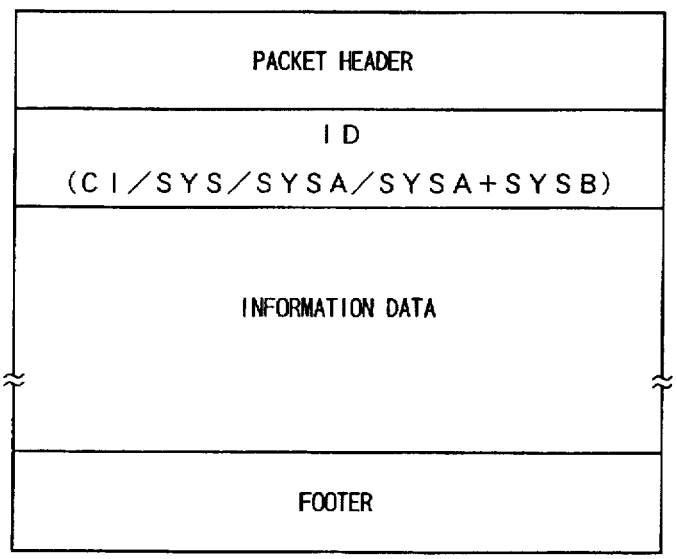
FIG. 7 is a schematic diagram showing a packet format in the first embodiment.

In this embodiment, as an example of the identifier, CI, SYS, SYSA and SYSA+SYSB are predetermined as shown in FIG. 7. When the ID is "CI", this packet conveys usual communication information between the subscriber terminal and the network. Similarly, ID ="SYS" means the system data SYSLD or SYSTD transferred from the call processor 104. ID="SYSA" means the predetermined system data SYSLT or SYSTL transferred from the call processor 104. Finally, ID="SYSA+SYSB" means the predetermined system data SYSLT or SYSTL transferred between the line circuit 101 and the trunk circuit 102 through the fixed path of the time division switch 103.

The call processor 104 transfers such system data packets to the line circuit 101 and the trunk circuit 102.

System data transfer operation

Figure 8:
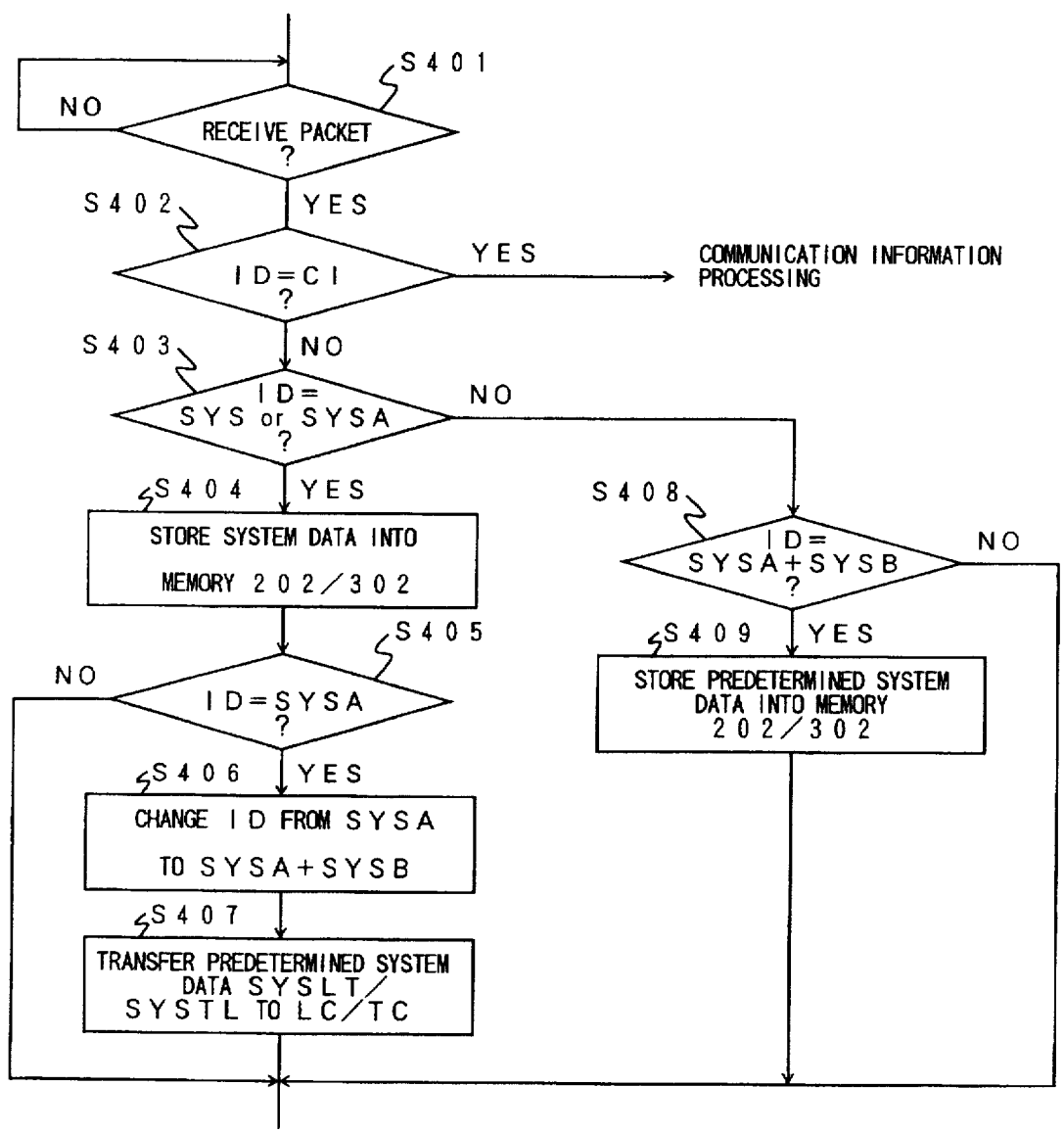
FIG. 8 is a flow chart showing an operation of the line circuit and the trunk circuit in the first embodiment.

The system data transfer software as shown in FIG. 8 is stored in the ROM 206 of the line circuit 101 and the ROM 306 of the trunk circuit 102. The operation of the system data transfer from the trunk circuit 102 to the line circuit 101 will be described hereinafter referring to FIG. 8.

When the controller 301 of the trunk circuit 102 receives a packet (Yes in step S401), the controller 301 determines whether the identifier ID of the packet is identical to "CI" (S402). If ID ="CI", the control proceeds to a communication information processing step (not shown). If ID is not identical to "CI", it is subsequently determined whether the identifier ID is identical to "SYS" or "SYSA" (S403).

If the identifier ID of the packet is identical to "SYS" or "SYSA", meaning that the packet data is the system data SYSTD for the trunk circuit 102, the system data SYSTD is stored into the memory 302 (S404). Further, if the identifier ID is identical to "SYSA" (Yes in step S405), the packet data is also the predetermined system data SYSLT to be transferred to the line circuit 101. Therefore, the identifier ID of the packet is changed from "SYSA" to "SYSA+SYSB", in other words, "SYSB" is added to the identifier "SYSA" (S406). The packet having the new identifier "SYSA+SYSB" is transferred from the trunk circuit 102 to the line circuit 101 through the fixed path of the time division switch 103 (S407).

If the identifier of the packet is not identical to "SYS" or "SYSA" (No in step S403), it is determined whether the identifier ID is identical to "SYSA+SYSB" (S408). When ID="SYSA+SYSB", it is determined that the packet data is the predetermined system data SYSTL which is transferred from the line circuit 101 through the fixed path of the time division switch 103. Therefore, the predetermined system data SYSTL is stored into the memory 302 (S409).

Similarly, the operation of the system data transfer from the line circuit 101 to the trunk circuit 102 is performed according to the software as shown in FIG. 8. To be brief, if the identifier ID of a received packet is identical to "SYS" or "SYSA", the controller 201 determines that the packet data is the system data SYSLD for the line circuit 101 to be stored into the memory 202 (S404). Further, if the identifier ID is identical to "SYSA" (Yes in step S405), the packet data is also the predetermined system data SYSTL to be transferred to the trunk circuit 102. Therefore, the identifier ID of the packet is changed from "SYSA" to "SYSA+SYSB" (S406). The packet having the new identifier "SYSA+SYSB"is transferred from the line circuit 101 to the trunk circuit 102 through the fixed path of the time division switch 103 (S407).

When the identifier ID is identical to "SYSA+SYSB", it is determined that the packet data is the predetermined system data SYSLT which is transferred from the trunk circuit 102 through the fixed path of the time division switch 103. Therefore, the predetermined system data SYSLT is stored into the memory 202 (S409).

In this way, the call processor 104 transmits to the line circuit 101 and the trunk circuit 102 the system data packets including the predetermined system data packets each having an identifier which discriminates between the system data and the predetermined system data. In the line circuit 101, the system data packets received from the call processor 104 are stored in the memory 202. The predetermined system data packets are automatically selected by the controller 201 and are transferred to the trunk circuit 102 through the fixed path. It is the same with the trunk circuit 102.

SECOND EMBODIMENT

Figure 9:
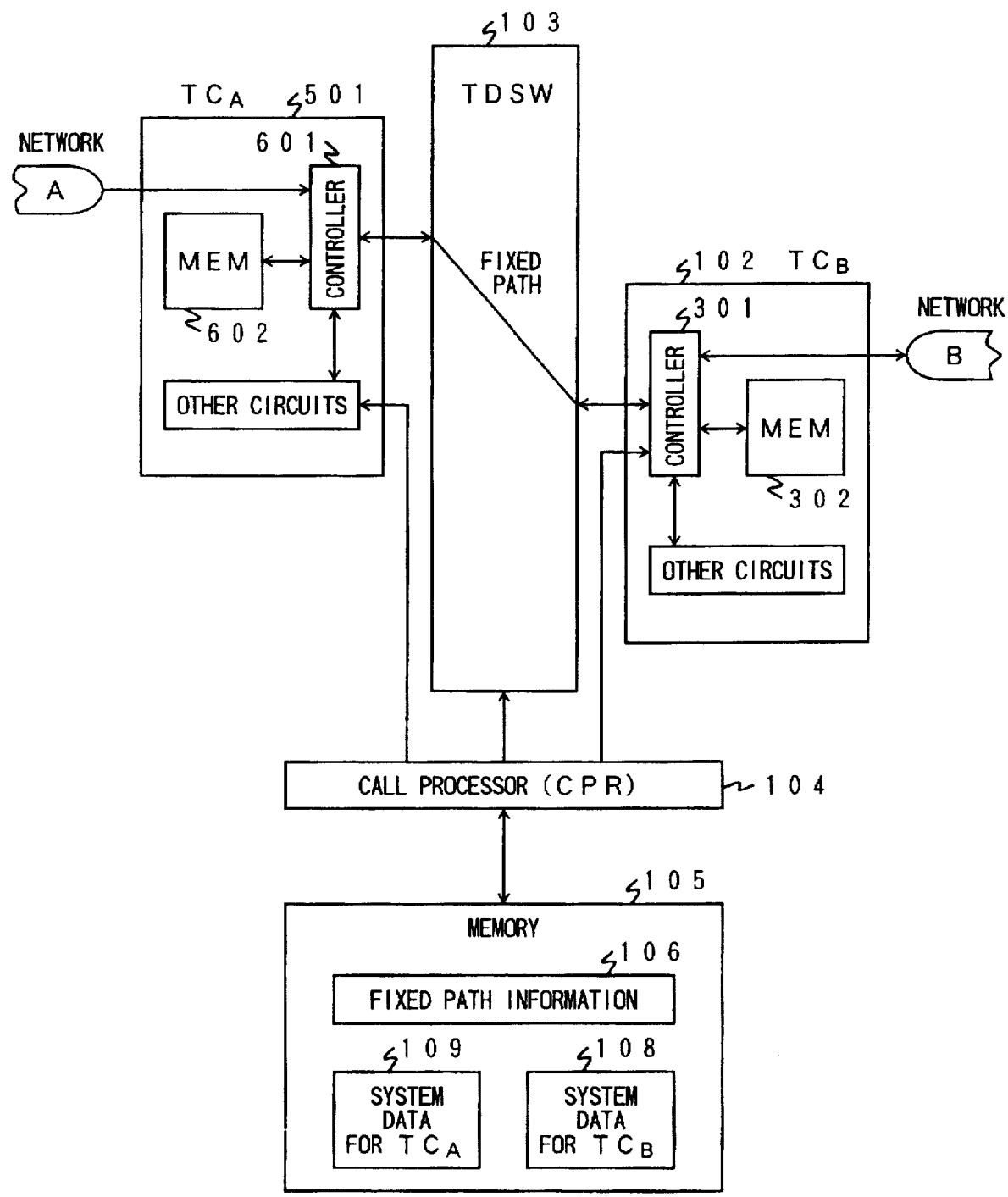
FIG. 9 is a block diagram showing a switching system of a second embodiment according to the present invention.

The present invention may be applied to a switching system connecting one network to another network. Referring to FIG. 9, in which blocks similar to those previously described with reference to FIG. 3 are denoted by the same reference numerals, the switching system is comprised of a plurality of trunk circuits $TC_A$ and a plurality of trunk circuits $TC_B$ which are respectively connected through fixed paths formed in the time division switch (TDSW) 103. For simplicity, it is assumed that a trunk circuit 501 is connected to a trunk circuit 102 through a fixed path of the time division switch 103. The trunk circuits 501 and 102 are connected to networks A and B, respectively, each network being an ISDN public network, a private network, a private line and or similar.

The data stored in the system memory 105 is comprised of a fixed path information file 106 and system data files 108 and 109. The call processor 104 uses the fixed path information file 106 to form predetermined fixed paths in the time division switch 103. The system data file 108 is comprised of interface data for the trunk circuit 102 including predetermined system data which is also used in the trunk circuit 501. The system data file 109 is comprised of interface data for the trunk circuit 501 including predetermined system data which is also used in the trunk circuit 102.

Figure 10:
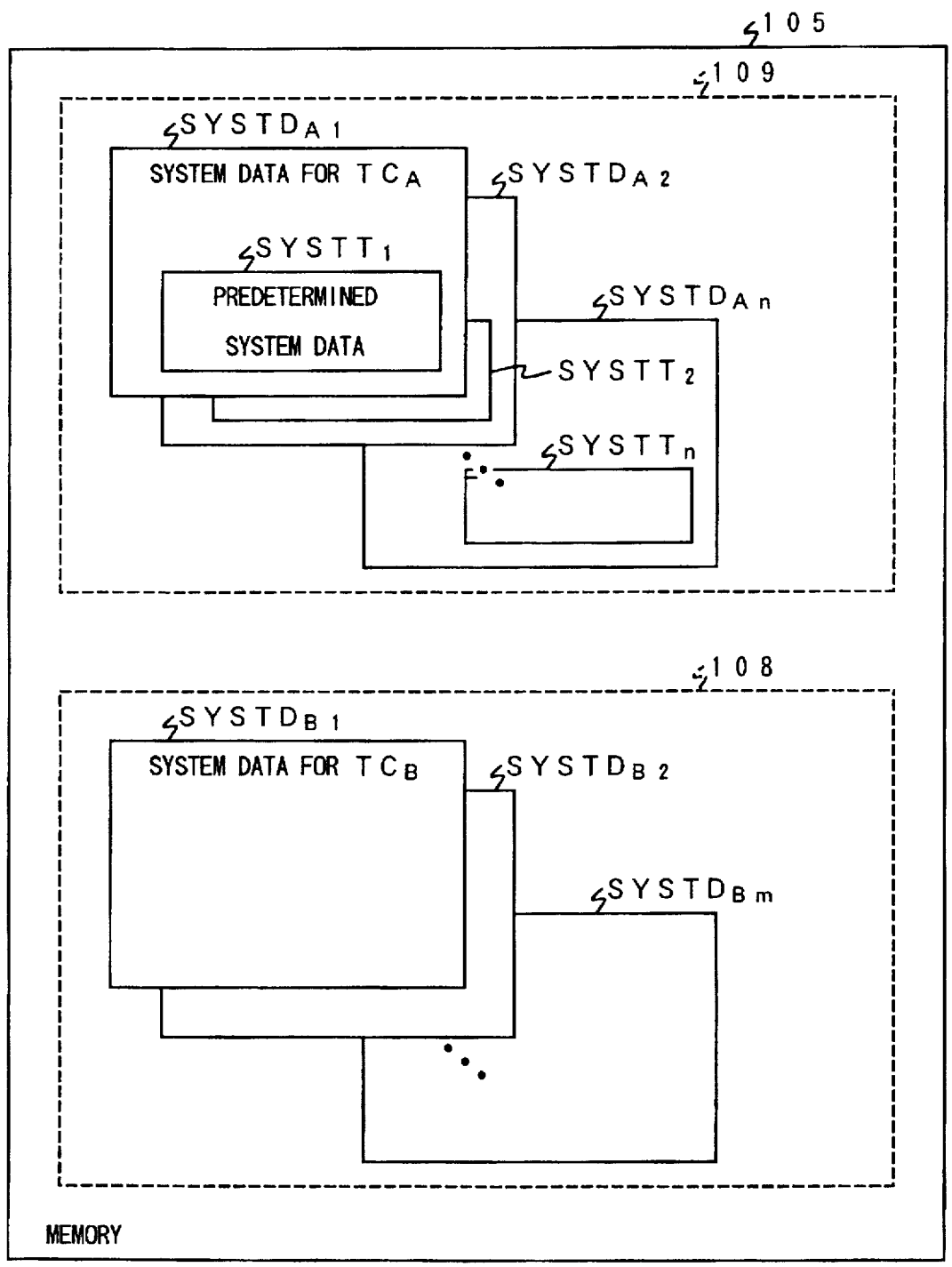
FIG. 10 is a schematic diagram showing a data file configuration of a system memory in the second embodiment.

Referring to FIG. 10, the system data file 109 is comprised of the system data $SYSTD_{A1}$–$SYSTD_{An}$, for the respective trunk circuits $TC_{A1}$–$TC_{An}$. Hereinafter, it is assumed that the system data $SYSTD_{A1}$–$SYSTD_{An}$ include the predetermined system data $SYSTT_1$–$SYSTT_n$, respectively, which are to be transferred to trunk circuits $TC_B$ through the predetermined fixed paths of the time division switch 103.

As mentioned above, the system data $SYSTD_A$ and $SYSTD_B$ are transferred in packet form from the call processor 104 to the trunk circuit 501 and the trunk circuit 102, respectively. Therefore, a predetermined identifier (ID) is attached to each packet of system data in order to discriminate between the system data packet and the other packets as shown in FIG. 7.

In this embodiment, the system data transfer operation is similarly performed as shown in FIG. 8. To be brief, the system data transfer software as shown in FIG. 8 is stored in the trunk circuit 501 and the trunk circuit 102. The call processor 104 transmits to the trunk circuit 501 the system data packets including the predetermined system data packets each having an identifier which discriminates between the system data SYSTDA and the predetermined system data SYSTT. In the trunk circuit 501, the system data packets received from the call processor 104 are stored in the memory 602. The predetermined system data packets are automatically selected by the controller 601 and are transferred to the trunk circuit 102 through the fixed path. It is the same with the trunk circuit 102.

THIRD EMBODIMENT

Figure 11:
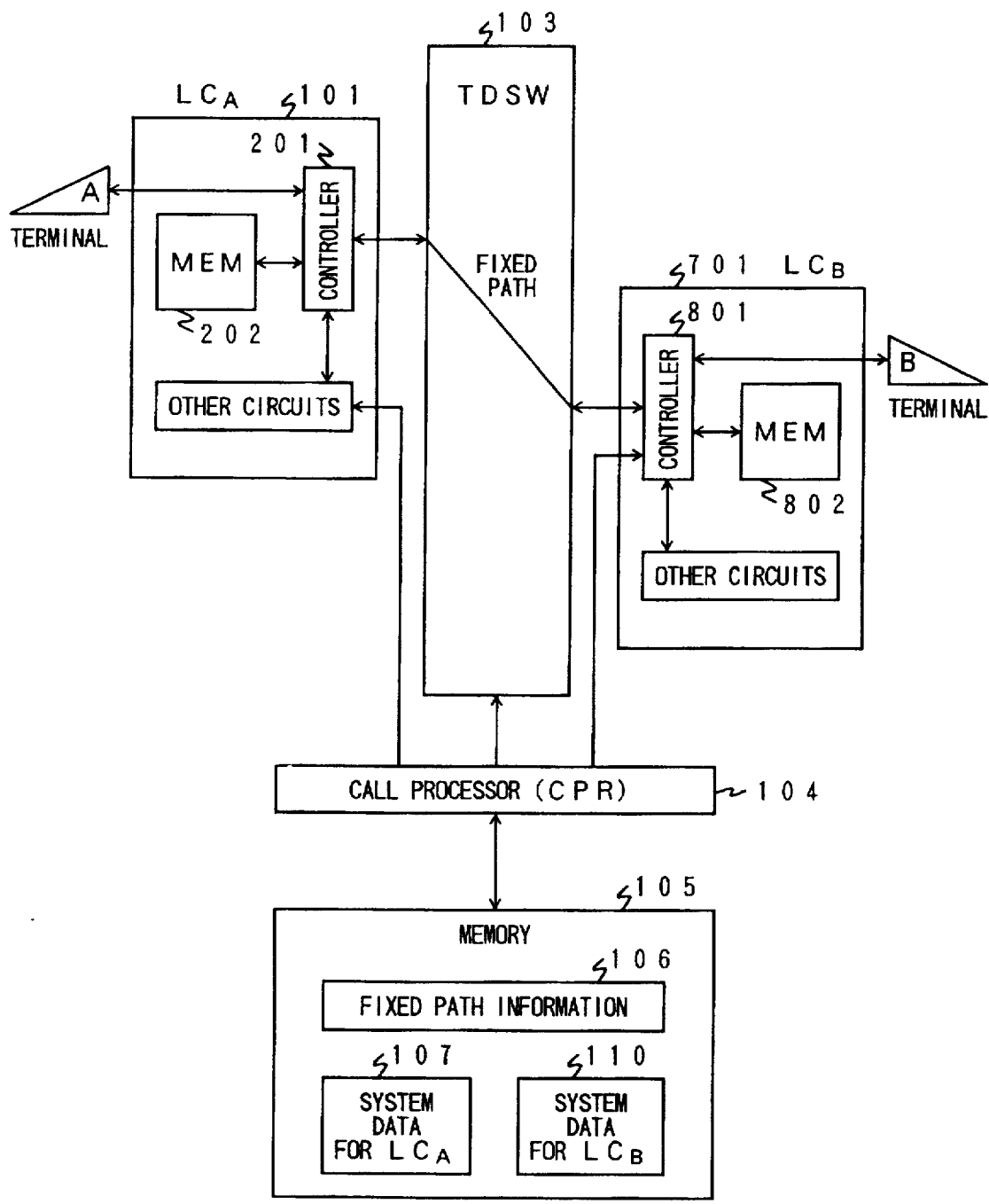
FIG. 11 is a block diagram showing a switching system of a third embodiment according to the present invention.

The present invention may be applied to a switching system connecting one subscriber terminal and the other subscriber terminal. Referring to FIG. 11, in which blocks similar to those previously described with reference to FIG. 3 are denoted by the same reference numerals, the switching system is comprised of a plurality of line circuits $LC_A$ and a plurality of line circuits $LC_B$ which are respectively connected through fixed paths formed in the time division switch (TDSW) 103. For simplicity, it is assumed that a line circuit 101 is connected to a line circuit 701 through a fixed path of the time division switch 103. The line circuits 101 and 701 are connected to terminals A and B, respectively, each terminal being an ISDN terminal.

The data stored in the system memory 105 is comprised of a fixed path information file 106 and system data files 107 and 110. The call processor 104 uses the fixed path information file 106 to form predetermined fixed paths in the time division switch 103. The system data file 107 is comprised of interface data for the line circuit 101 including predetermined system data which is also used in the line circuit 701. The system data file 110 is comprised of interface data for the line circuit 701 including predetermined system data which is also used in the line circuit 101.

Figure 12:
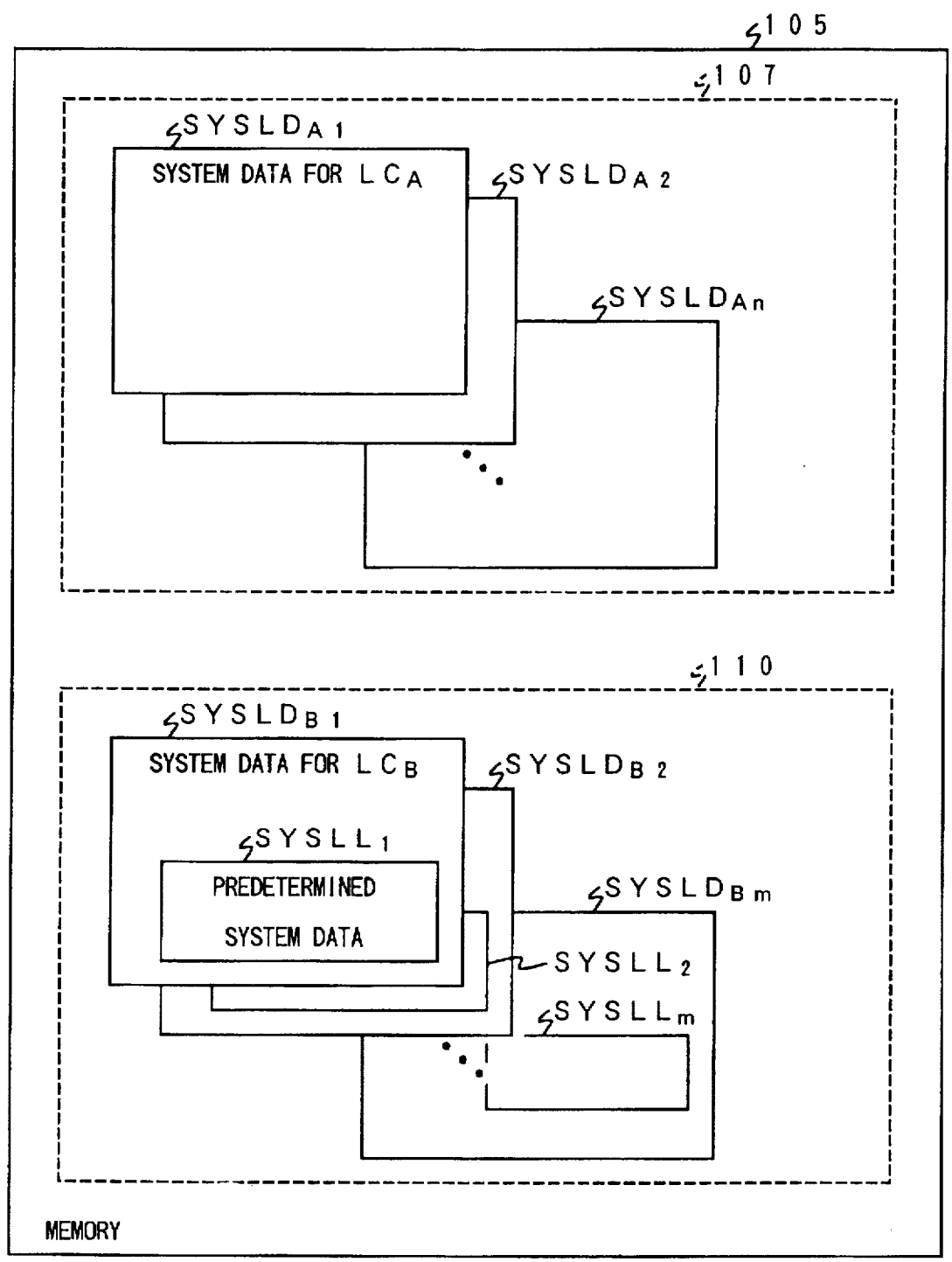
FIG. 12 is a schematic diagram showing a data file configuration of a system memory in the third embodiment.

Referring to FIG. 12, the system data file 110 is comprised of the system data $SYSLD_{B1}$–$SYSLD_{Bm}$ for the respective line circuits $LC_{B1}$–$LC_{Bm}$. Hereinafter, it is assumed that the system data $SYSLD_{B1}$–$SYSLD_{Bm}$ include the predetermined system data $SYSLL_1$–$SYSLL_m$, respectively, which are to be transferred to line circuits $LC_A$ through the predetermined fixed paths of the time division switch 103.

As mentioned above, the system data $SYSLD_A$ and $SYSLD_B$ are transferred in packet form from the call processor 104 to the line circuit 101 and the line circuit 701, respectively. Therefore, a predetermined identifier (ID) is attached to each packet of system data in order to discriminate between the system data packet and the other packets as shown in FIG. 7.

In this embodiment, the system data transfer operation is similarly performed as shown in FIG. 8. To be brief, the system data transfer software as shown in FIG. 8 is stored in the line circuit 101 and the line circuit 701. The call processor 104 transmits to the line circuit 701 the system data packets including the predetermined system data packets each having an identifier which discriminates between the system data $SYSLD_B$ and the predetermined system data SYSLL. In the line circuit 701, the system data packets received from the call processor 104 are stored in the memory 802. The predetermined system data packets are automatically selected by the controller 801 and are transferred to the line circuit 101 through the fixed path. It is the same with the line circuit 101.

What is claimed is:

1. A communication system comprising:
   a plurality of line supervising circuits;
   a system memory for storing at least the system information for each line supervising circuit; and
   a switch for forming a predetermined path through which two of the line supervising circuits are connected to each other,
   each line supervising circuit comprising:
   receiving means for receiving information;
   first discriminating means for discriminating system information from the information, the system information received from the system memory including interface data for the line supervising circuit;
   second discriminating means for discriminating first system information from the system information;
   third discriminating means for discriminating second system information from the information, the second system information being received through the predetermined path; and
   transferring means for transferring the first system information to another line supervising circuit through the predetermined path;
   wherein the transferring means does not transfer any other system information to any of said plurality of said line supervising circuits.

2. The communication system according to claim 1, further comprising
   a controller for controlling the switch, the line supervising circuits and the system memory such that the predetermined path is formed in the switch and such that the system information is transferred from the system memory to the line supervising circuit.

3. The communication system according to claim 1, wherein each line supervising circuit further comprises:
   a memory for storing the system information and the second system information; and
   a processor for processing communication information included in the information using the system information and the second system information stored in the memory.

4. The communication system according to claim 1, wherein the receiving means receives the information as information packets.

5. The communication system according to claim 4, wherein an identifier of each information packet discriminates between the system information, the first system information, and the second system information.

6. The communication system according to claim 5, wherein the identifier of each information packet has at least four values associated with communication information, the system information, the first system information, and the second system information, respectively.

7. A switching system comprising:
   a plurality of line circuits;
   a plurality of trunk circuits;
   a time division switch for forming a predetermined path through which a line circuit is connected to a trunk circuit; and
   a system memory for storing at least first system data for the line circuit, second system data for the trunk circuit, and path forming information for specifying the predetermined path of the time division switch,
   the line circuit comprising:
   first receiving means for receiving first information;
   first discriminating means for discriminating first system information from the first information, the first system information comprising the first system data for the line circuit received from the system memory;
   second discriminating means for discriminating first predetermined system information from the first system information;
   third discriminating means for discriminating second predetermined system information from the first information, the second predetermined system information being received from the trunk circuit through the predetermined path; and first transferring means for transferring the first predetermined system information to the trunk circuit through the predetermined paths;

wherein the first transferring means does not transfer any other first system information to any of said plurality of said first and second line supervising circuits, and the trunk circuit comprising:

second receiving means for receiving second information;

fourth discriminating means for discriminating second system information from the second information, the second system information comprising the second system data for the trunk circuit received from the system memory;

fifth discriminating means for discriminating the second predetermined system information from the second system information;

sixth discriminating means for discriminating the first predetermined system information from the second information, the second predetermined system information being received from the line circuit through the predetermined path; and second transferring means for transferring the second predetermined system information to the line circuit through the predetermined path;

wherein the second transferring means does not transfer any other second system information to any of said plurality of said first and second line supervising circuits.

8. The switching system according to claim 7, wherein the first system data for the line circuit includes first predetermined system data for the first predetermined system information, and the second system data for the trunk circuit includes second predetermined system data for the second predetermined system information.

9. The switching system according to claim 7, further comprising a controller for controlling the time division switch, the line circuits, the trunk circuits, and the system memory such that the predetermined path is formed in the switch and such that the first system information is transferred from the system memory to the line circuit and the second system information is transferred from the system memory to the trunk circuit.

10. The switching system according to claim 7, wherein: the line circuit further comprises:

a first memory for storing the first system data and the second predetermined system data; and a processor for processing communication information included in the first information using the first system data and the second predetermined system data stored in the first memory, and the trunk circuit further comprises:

a second memory for storing the second system data and the first predetermined system data; and a second processor for processing communication information included in the second information using the second system data and the first predetermined system data stored in the first memory.

11. The switching system according to claim 7, wherein the first information and the second information comprise information packets.

12. A switching system comprising:

a plurality of first line circuits;

a plurality of second line circuits;

a time division switch for forming a predetermined path through which a first line circuit is connected to a second line circuit; and a system memory for storing at least first system data for the first line circuit, second system data for the second line circuit, and path forming information for specifying the predetermined path of the time division switch, the first line circuit comprising:

first receiving means for receiving first information;

first discriminating means for discriminating first system information from the first information, the first system information comprising the first system data for the first line circuit received from the system memory;

second discriminating means for discriminating first predetermined system information from the first system information;

third discriminating means for discriminating second predetermined system information from the first information, the second predetermined system information being received from the second line circuit through the predetermined path; and first transferring means for transferring the first predetermined system information to the second line circuit through the predetermined path, and the second line circuit comprising:

second receiving means for receiving second information;

fourth discriminating means for discriminating second system information from the second information, the second system information comprising the second system data for the second line circuit received from the system memory;

fifth discriminating means for discriminating the second predetermined system information from the second system information;

sixth discriminating means for discriminating the first predetermined system information from the second information, the second predetermined system information being received from the first line circuit through the predetermined path; and second transferring means for transferring the second predetermined system information to the first line circuit through the predetermined path.

13. The switching system according to claim 12, wherein the first system data for the first line circuit includes first predetermined system data for the first predetermined system information, and the second system data for the second line circuit includes second predetermined system data for the second predetermined system information.

14. The switching system according to claim 12, further comprising a controller for controlling the time division switch, the first line circuits, the second line circuits, and the system memory such that the predetermined path is formed in the switch and such that the first system information is transferred from the system memory to the first line circuit and the second system information is transferred from the system memory to the second line circuit.

15. The switching system according to claim 12, wherein: the first line circuit further comprises:

a first memory for storing the first system data and the second predetermined system data; and a processor for processing communication information included in the first information using the first system data and the second predetermined system data stored in the first memory, and the second line circuit further comprises:
- a second memory for storing the second system data and the first predetermined system data; and
- a second processor for processing communication information included in the second information using the second system data and the first predetermined system data stored in the first memory.

16. The switching system according to claim 12, wherein the first information and the second information comprise information packets.

17. A switching system comprising:
a plurality of first trunk circuits;
a plurality of second trunk circuits;
a time division switch for forming a predetermined path through which a first trunk circuit is connected to a second trunk circuit; and
a system memory for storing at least first system data for the first trunk circuit, second system data for the second trunk circuit, and path forming information for specifying the predetermined path of the time division switch, the first trunk circuit comprising:
- first receiving means for receiving first information;
- first discriminating means for discriminating first system information from the first information, the first system information comprising the first system data for the first trunk circuit received from the system memory;
- second discriminating means for discriminating first predetermined system information from the first system information;
- third discriminating means for discriminating second predetermined system information from the first information, the second predetermined system information being received from the second trunk circuit through the predetermined path; and
- first transferring means for transferring the first predetermined system information to the second trunk circuit through the predetermined path, and the second trunk circuit comprising:
- second receiving means for receiving second information;
- fourth discriminating means for discriminating second system information from the second information, the second system information comprising the second system data for the second trunk circuit received from the system memory;
- fifth discriminating means for discriminating the second predetermined system information from the second system information;
- sixth discriminating means for discriminating the first predetermined system information from the second information, the second predetermined system information being received from the first trunk circuit through the predetermined path; and
- second transferring means for transferring the second predetermined system information to the first trunk circuit through the predetermined path.

18. The switching system according to claim 17, wherein
the first system data for the first trunk circuit includes first predetermined system data for the first predetermined system information, and
the second system data for the second trunk circuit includes second predetermined system data for the second predetermined system information.

19. The switching system according to claim 17, further comprising a controller for controlling the time division switch, the first trunk circuits, the second trunk circuits, and the system memory such that the predetermined path is formed in the switch and such that the first system information is transferred from the system memory to the first trunk circuit and the second system information is transferred from the system memory to the second trunk circuit.

20. The switching system according to claim 17, wherein:
the first trunk circuit further comprises:
- a first memory for storing the first system data and the second predetermined system data; and
- a processor for processing communication information included in the first information using the first system data and the second predetermined system data stored in the first memory, and the second trunk circuit further comprises:
- a second memory for storing the second system data and the first predetermined system data; and
- a second processor for processing communication information included in the second information using the second system data and the first predetermined system data stored in the first memory.

21. The switching system according to claim 17, wherein the first information and the second information comprise information packets.

22. A method for transferring system data from a system memory to a plurality of line supervising circuits through a system controller in a switching system comprising a switch, the method comprising the steps of:

forming a predetermined path in the switch, the predetermined path connecting a first line supervising circuit and a second line supervising circuit of the line supervising circuits;

transferring first system information from the system memory to the first line supervising circuit, the first system information comprising first system data stored in the system memory;

discriminating first predetermined system information from the first system information in the first line supervising circuit; and transferring the first predetermined system information from the first line supervising circuit to the second line supervising circuit through the predetermined path;

wherein said transferring the first predetermined system information step does not transfer any other first system information to any of said plurality of said line supervising circuits.

23. The method according to claim 22, wherein the system memory stores at least the system data for each line supervising circuit.

24. The method according to claim 23, wherein communication information is processed by the second line supervising circuit using second system data for the second line supervising circuit and the first predetermined system information, the second system data being received from the system memory.

25. The method according to claim 22, wherein the first system information and the first predetermined system information comprise information packets.

26. The method according to claim 25, wherein an identifier of each information packet discriminates between the first system information and the first predetermined system information.

27. The method according to claim 22, wherein the first line supervising circuit is a line circuit and the second line supervising circuit is a trunk circuit.

28. The method according to claim 22, wherein the first line supervising circuit is a trunk circuit and the second line supervising circuit is a line circuit.

29. The method according to claim 22, wherein the first line supervising circuit is a line circuit and the second line supervising circuit is a line circuit.

30. The method according to claim 22, wherein the first line supervising circuit is a trunk circuit and the second line supervising circuit is a trunk circuit.

31. The communication system according to claim 1, wherein the two of the line supervising circuits comprises a line circuit and a trunk circuit.

32. The communication system according to claim 1, wherein the two of the line supervising circuits both are a trunk circuit.

33. The communication system according to claim 1, wherein the two of the line supervising circuits both are a line circuit.

34. A system for transferring system data from a system memory to a plurality of line supervising circuits in a switching system, the system comprising:

a switch for forming a predetermined path connecting a first line supervising circuit and a second line supervising circuit of the line supervising circuits; and a controller for transferring first system information from the system memory to the first line supervising circuit, the first system information comprising first system data stored in the system memory, the first line supervising circuit discriminating first predetermined system information from the first system information, and the first line supervising circuit transferring the first predetermined system information to the second line supervising circuit through the predetermined paths;

wherein said first line supervising circuit does not transfer any other first system information to any of said plurality of said line supervising circuits.

35. The system according to claim 34, wherein the second line supervising circuit comprises:

a memory for storing second system data and the first predetermined system data, the second system data being received from the system memory; and a processor for processing communication information by using the second system data and the first predetermined system data stored in the memory.

36. The system according to claim 34, wherein the first system information and the first predetermined system information comprise information packets.

37. The system according to claim 36, wherein an identifier of each information packet discriminates between the first system information and the first predetermined system information.

38. The system according to claim 34, wherein the first line supervising circuit is a line circuit and the second line supervising circuit is a trunk circuit.

39. The system according to claim 34, wherein the first line supervising circuit is a trunk circuit and the second line supervising circuit is a line circuit.

40. The system according to claim 34, wherein the first line supervising circuit is a line circuit and the second line supervising circuit is a line circuit.

41. The system according to claim 34, wherein the first line supervising circuit is a trunk circuit and the second line supervising circuit is a trunk circuit.

* * * * *

UNITED STATES PATENT AND TRADEMARK OFFICE
CERTIFICATE OF CORRECTION

PATENT NO.  : 5,754,550
DATED       : May 19, 1998
INVENTOR(S) : Koji Endo

It is certified that error(s) appears in the above-identified patent and that said Letters Patent is hereby corrected as shown below:

Column 1, line 43 delete "SYSTD" and insert --$SYSTD_m$--.

Signed and Sealed this

Twenty-second Day of September, 1998

*Attest:*

BRUCE LEHMAN

*Attesting Officer*    Commissioner of Patents and Trademarks